United States Patent [19]
Hamblen et al.

[11] Patent Number: 5,301,249
[45] Date of Patent: Apr. 5, 1994

[54] CATOPTRIC COUPLING TO AN OPTICAL FIBER

[75] Inventors: David P. Hamblen; David S. Ross, both of Rochester, N.Y.

[73] Assignee: Eastman Kodak Company, Rochester, N.Y.

[21] Appl. No.: 999,325

[22] Filed: Dec. 31, 1992

[51] Int. Cl.5 .............................................. G02B 6/24
[52] U.S. Cl. ..................... 385/31; 359/858; 385/33; 385/47; 385/73; 385/92
[58] Field of Search ............... 385/31, 33, 34, 35, 385/38, 47, 48, 73, 74, 88, 92, 93; 395/858

[56] References Cited

U.S. PATENT DOCUMENTS

| | | | |
|---|---|---|---|
| 3,664,750 | 5/1972 | Hock | 359/858 X |
| 3,932,023 | 1/1976 | Humer | 350/96 C |
| 4,021,099 | 5/1977 | Kawasaki et al. | 385/35 |
| 4,054,364 | 10/1977 | Webster | 385/33 |
| 4,185,885 | 1/1980 | Chown et al. | 385/73 |
| 4,257,672 | 3/1981 | Balliet | 350/96.17 |
| 4,675,860 | 6/1987 | Laude et al. | 370/3 |
| 4,678,269 | 7/1987 | Pace | 350/96.18 |
| 4,717,229 | 1/1988 | Cutler | 385/31 |
| 4,744,618 | 5/1988 | Mahlein | 350/96.19 |
| 4,747,660 | 5/1988 | Nishioka et al. | 350/96.25 |
| 4,755,017 | 7/1988 | Kapany | 350/96.18 |
| 4,767,172 | 8/1988 | Nichols et al. | 350/96.18 |
| 4,781,426 | 11/1988 | Baker | 350/96.16 |
| 4,902,093 | 2/1990 | Bowen | 350/96.20 |
| 4,909,586 | 3/1990 | Tanaka et al. | 385/33 |
| 4,934,784 | 6/1990 | Kapany et al. | 350/96.18 |
| 4,935,939 | 6/1990 | Liau et al. | 350/96.15 X |
| 4,981,343 | 1/1991 | Folsom | 350/444 |
| 4,993,796 | 2/1991 | Kapany et al. | 350/96.15 |

OTHER PUBLICATIONS

G. Rogers and M. Fitch, "Lens Coupling Boosts Light Launching", Photonics Spectra, pp. 175-176 (Sep. 1991).

Melles Griot Catalog, pp. 20-15 to 20-18, 20-42 to 20-45, no date.

*Primary Examiner*—John D. Lee
*Attorney, Agent, or Firm*—Heslin & Rothenberg

[57] ABSTRACT

A device for coupling a laser diode emission to an optical fiber is provided. The device utilizes two opposed mirrors to redirect the divergent light beam of the laser diode to within the smaller numerical aperture or angle of acceptance of the optical fiber. The two opposed mirrors can be, for example, concave elliptical mirrors, a convex spherical and a concave spherical mirror, or a planar mirror and a concave spherical mirror. Each mirror has an aperture therein to allow passage of the initial laser diode beam or the redirected beam to the optical fiber.

23 Claims, 5 Drawing Sheets

CATOPTRIC COUPLING TO AN OPTICAL FIBER

TECHNICAL FIELD

This invention relates to a device for catoptric coupling of a laser diode emission to an optical fiber. More particularly, the invention provides a system of dual mirrored surfaces which direct the divergent elliptical emission from a laser diode into the relatively small acceptance angle at the core of an optical fiber, with minimum loss of light.

BACKGROUND ART

The output of a laser diode is an asymmetric, highly divergent cone of light which in cross section resembles an ellipse. Lateral spread of the divergent light is generally 25-35 degrees by 8-10 degrees for the major and minor axes of the ellipse. Most laser applications require a collimated symmetric beam of light, and therefore the natural divergence of the laser diode must be corrected. Energy losses can be large if the elliptical beam is not redirected and focused.

Currently, the divergent light spread is predominantly redirected through the use of refracting optics. Compound lenses, usually triplets, and more elaborate systems of collimator lenses and anamorphic prism pairs are used. For example, Seastar Optics (Sidney, British Columbia, Canada) provides a coupling device which includes a pair of diffraction-limited glass aspheric molded lenses. The smaller of the two lenses, a high-numerical-aperture collimator, collects nearly all of the available laser diode light. Then the larger lens directs the light into the fiber. Coupling efficiencies of greater than 50 percent for single-mode applications are thus obtained (G. Rogers and M. Fitch, Photonics Spectra, 175-176, September 1991). In order to compensate for light losses, due to the coupling efficiency being less than 100 percent, higher milliwatt laser diodes are used. These higher milliwatt laser diodes are more powerful and therefore input more light into the system. More light is therefore input into the fiber, even though the coupling efficiency has not been increased. The need for higher milliwatt laser diodes contributes both bulk and temperature problems to the coupling system.

Melles Griot Co. offers a system which utilizes lenses combined with a series of mounted beam expanders, collimators and a mounted anamorphic prism pair to correct the asymmetric output of the laser diode. Once again this lens system is bulky and costly.

Further problems associated with the redirection of laser diode emissions using lenses involve spherical aberration and back reflection of light to the laser diode. Lenses typically reflect back about 4% of the light, degrading the intensity of the laser diode beam. Lenses are also devised for use at optimum wavelengths, and the wavelength of the laser diode emission can be altered by temperature changes and by the back reflection. Once the wavelength of the laser diode shifts, the lens system may no longer be appropriate for the new wavelength. Lens systems also tend to lose part of the elliptical beam when focusing to a circular collection site.

In an attempt to overcome these problems, U.S. Pat. No. 4,981,343, issued Jan. 1, 1991, to Folsom and entitled "Focusing Mirror Lens", provides a monolithic, transparent, preferably cylindrical lens body upon the opposite entrance and exit ends of which are coated focusing mirrors. At least one of the mirrors, and preferably both, has the configuration of a segment of a circular cylinder. The other mirror may have the configuration of a segment of a circular cylinder or of a sphere. The axes of the mirrors, when both are segments of a cylinder, are perpendicular to each other. Each of the mirrors has a light-transmitting unmirrored pupil aligned along the longitudinal axis of the lens body. When light passes through the entrance pupil, it passes through the lens body, is focused in a given orientation by the exit mirror and reflected back to the entrance mirror where it is again focused in an orientation perpendicular to the first orientation and is reflected toward and out the exit pupil. This focusing mirror lens corrects for the astigmatism of a laser diode and can make highly elliptical beams less elliptical.

A need always exists for additional coupling devices for the efficient coupling of laser diodes to optical fibers. Such a coupling device can also be used to focus any source of radiant energy, especially where the source emits divergent radiation which must be directed to a relatively small aperture.

SUMMARY OF THE INVENTION

This need is met, and the problems of previous coupling devices overcome, by the catoptric coupling device of the subject invention. The invention provides a catoptric (utilizing mirrors) coupling device to direct radiant energy from a source to an optical fiber. This is accomplished by utilizing a first mirrored surface, and a second mirrored surface facing the first mirrored surface. Each mirrored surface has an aperture therein, and the mirrored surfaces are positioned relative to one another so that the apertures are coaxial with one another. A means is provided, as discussed in detail below, for positioning a source of radiant energy coaxially with the apertures, so that the source is positioned opposite the first mirrored surface. A means is also provided for positioning the light receiving end of an optical fiber coaxially with the aperture in the second mirrored surface. Each of the elements of the catoptric coupling device are thus positioned coaxially along an optical axis. The optical axis is drawn through the center of the apertures perpendicular to the planes of the mirrored surfaces.

Substantially all radiant energy generated by a source so positioned passes through the aperture in the first mirrored surface and travels to the second mirrored surface. The radiant energy impinging on the second mirrored surface is reflected back toward the first mirrored surface. The radiant energy which then impinges on the first mirrored surface is again reflected by that surface. The resulting reflected light is directed to the aperture in the second mirrored surface where it will impinge upon a light receiving end of an optical fiber so positioned.

Thus, radiant energy enters the dual mirror device through the aperture in the first mirrored surface and exits the device through the aperture in the second mirrored surface.

A laser diode, which is one example of a source of radiant energy useable in the subject invention, emits an elliptical beam. The laser diode is positioned at the aperture of the first mirrored surface such that the maximum cone angle of emission from the laser diode travels through the aperture and impinges upon the second mirrored surface. Similarly, the light receiving end of the optical fiber is positioned at the aperture in the second mirrored surface such that the acceptance angle of the core of the fiber is greater than or equal to the cone angle of the reflected beam from the first mirrored surface. In this manner, the maximum coupling of the radiant energy from the laser diode to the optical fiber occurs. Efficiencies of greater than 90 percent are attainable. This greatly exceeds the coupling efficiencies attainable by prior devices and methods. This greater efficiency enables lower power laser diodes to be utilized, thereby avoiding the bulk, cost, and temperature problems referred to above.

BRIEF DESCRIPTION OF THE DRAWINGS

These and other objects, advantages and features of the present invention will be more fully understood from the following detailed description of certain embodiments thereof when considered in conjunction with the accompanying drawings in which.

DESCRIPTION OF THE PREFERRED EMBODIMENTS

In accordance with the subject invention, a source of radiant energy is coupled to an optical fiber. An advantage of the subject invention is the maximum collection efficiency of the radiant energy from the source. This is especially applicable where the source emits a non-circular beam, such as with a laser diode. A laser diode emits an asymmetrical emission which in cross section resembles an elongated ellipse. The lateral spread of the emission is generally 25 to 35 degrees by 8 to 10 degrees for the major and minor axes. This divergent light spread must be redirected to the relatively small core of an optical fiber, often having a diameter in the range of 4 or 5 to 50 microns. The angle into which radiant energy can be accepted by the optical fiber is referred to as the maximum acceptance angle of the fiber. The coupler of this invention is equally applicable to sources other than laser diodes which also emit a spreading divergent beam of light.

Figure 1:
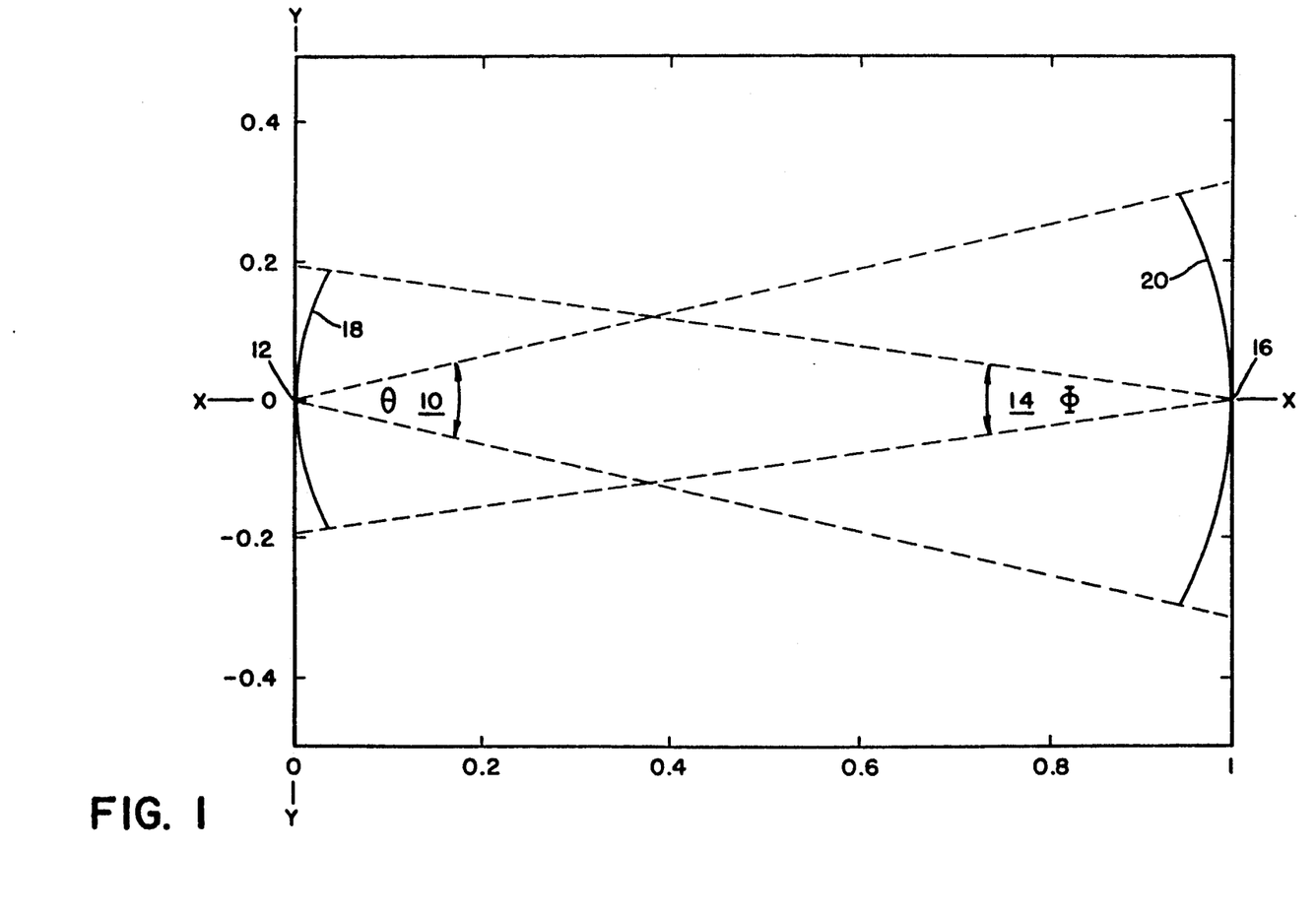
FIG. 1 illustrates the maximum cone angle of light emitted from a laser diode, and the maximum angle of acceptance of radiant energy by an optical fiber. Also shown are the two ellipses constructed based on mathematical formulas to direct radiant energy from the laser diode to the optical fiber.

FIG. 1 illustrates these angles. As shown, the laser diode 12 emits light within the maximum cone angle 10. The optical fiber 16 accepts light within the maximum acceptance angle 14.

The coupling device according to the subject invention utilizes complementary mirrors, i.e., is a "catoptric" coupling device, so as to redirect a maximum amount of the emission from the laser diode to the core of the optical fiber within the maximum acceptance angle. This is accomplished by utilizing a first and a second mirrored surface, positioned opposite one another. Each mirrored surface has an aperture therein, such that the apertures are coaxial with one another. When a laser diode and an optical fiber are coupled using the coupling device, the laser diode and optical fiber are also coaxial with the apertures. The coupling device, therefore, also includes means for positioning a source of radiant energy coaxially with the aperture of the first mirrored surface and means for positioning a light receiving end of an optical fiber coaxially with the aperture of the second mirrored surface.

The coupling device thus allows substantially all radiant energy generated by the laser diode to pass through the first aperture of the first mirrored surface to impinge upon the second mirrored surface. The radiant energy is then reflected by the second mirrored surface to impinge upon the first mirrored surface, where it is re-reflected back toward the second mirrored surface. The path of the re-reflected radiant energy has now been redirected so that substantially all of it passes through the aperture of the second mirrored surface. Additionally, the angle of the radiant energy has been reduced to be within the acceptance angle of the fiber, i.e. within the fiber's numerical aperture. As such, the redirected radiant energy impinges upon the light receiving end of the optical fiber positioned at the aperture.

Various embodiments can provide the coupling device of the subject invention. Proper positioning of opposed mirrors allows for the maximum collection of the ellipsoid emission.

Figure 2:
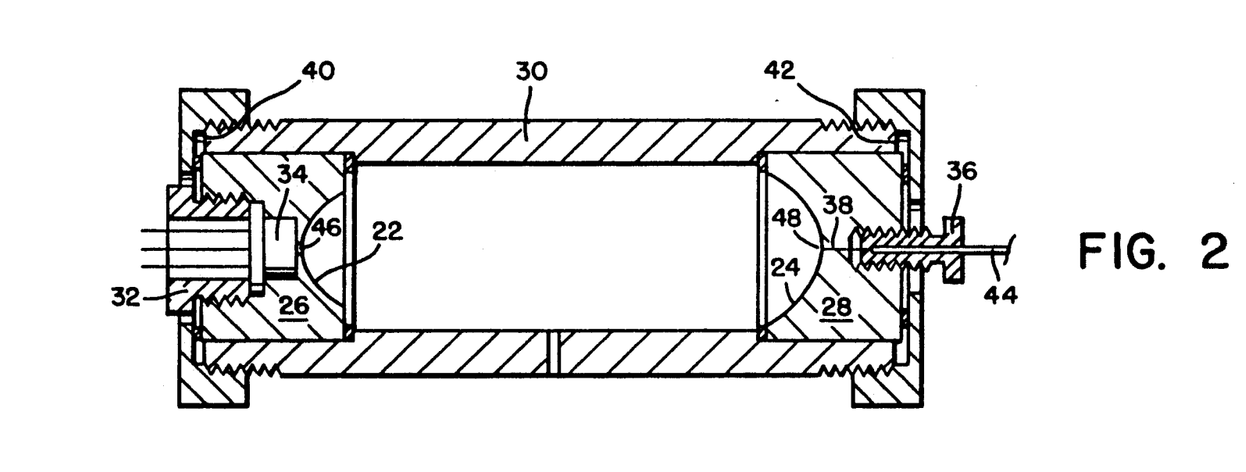
FIG. 2 shows a catoptric coupling device which is one embodiment of the subject invention in which two opposed elliptical mirrors are utilized.
Figure 3:
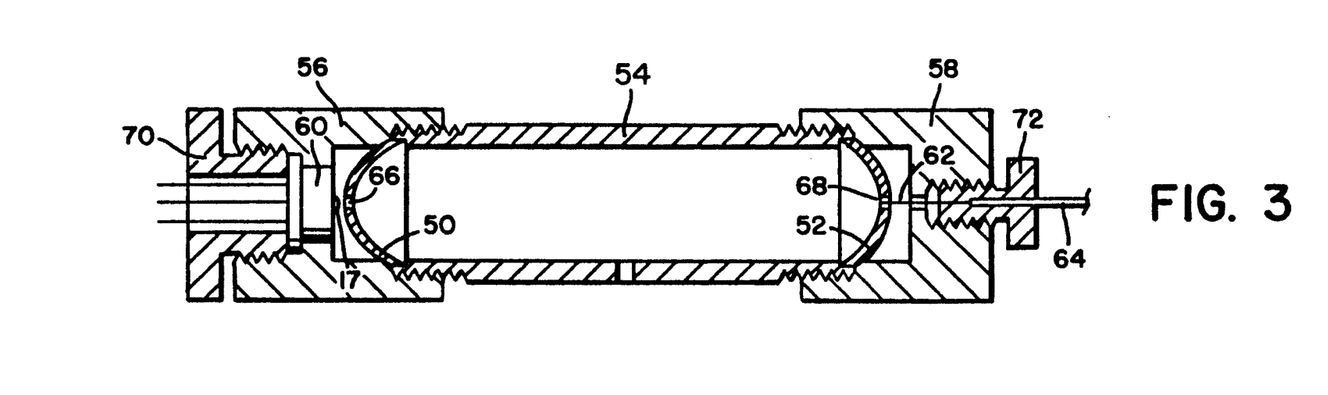
FIG. 3 shows a catoptric coupling device which is a further embodiment of the subject invention in which two opposed elliptical mirrors are utilized.
Figure 4:
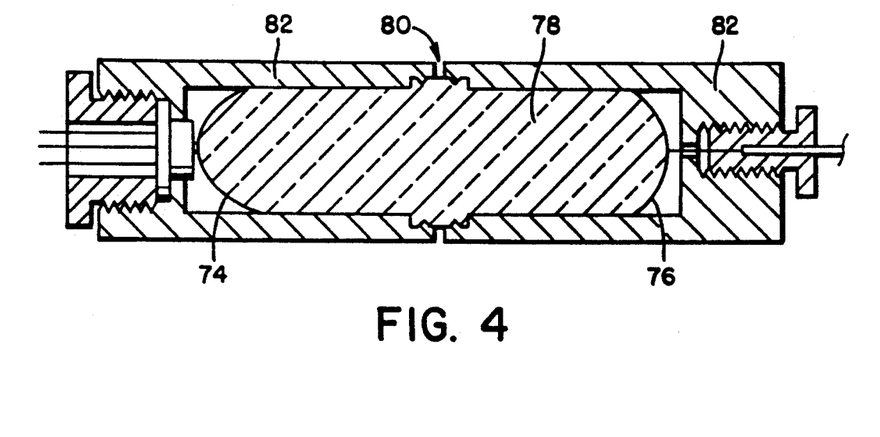
FIG. 4 shows a catoptric coupling device which is an additional embodiment of the subject invention in which two opposed elliptical mirrors, separated by a transparent solid material, are utilized.

Several embodiments, as shown in FIGS. 2-4, utilize two opposed elliptical mirrors, situated coaxially and concave inward. Each mirror has a different curvature and conic constant. The configuration of each mirror is described as a frustrum of an ellipsoid. Resembling a modified Cassegrain arrangement, the device's non-spherical mirrors direct light emission over a large numerical aperture (i.e., a laser diode divergent emission) into a smaller numerical aperture (i.e., the core of an optical fiber). The laser diode light source objective and the fiber optic image points are located at foci of their respective mirrors. Light from the laser diode is back reflected to the second, opposed elliptical mirror. This second mirror redirects light into a smaller cone angle to be accepted by the fiber core. All emission trajectories at smaller angles are subsequently and preferentially redirected from the laser diode to the fiber core for maximum collection efficiency. Each mirror has a small aperture on-axis to allow passage of the emission from the laser diode to the fiber core diameter, exclusive of the outer fiber cladding.

The positioning of the two opposed elliptical mirrors, as well as the desired curvature of the mirrors, can be determined and confirmed by mathematical formulas. Referring again to FIG. 1, the laser diode 12 represents a point source that radiates light in a cone having an angle 10. The axis of the optical fiber 16 coincides with the axis of the light cone, and the optical fiber has an acceptance angle 14. The distance between the point source and the tip of the optical fiber is L, but for purposes of this example can be normalized so that L is 1. For application of mathematical formulas, the diameter of the optical fiber is assumed to be so small when compared with 1 that it can be considered to be 0. Similarly, the point light source is assumed to be so small when compared with 1 that it can also be considered to be 0.

The x-axis coincides with the axis of the light cone. The y-axis is orthogonal to the x-axis. The y-axis indicates the perpendicular distance from the optical axis, the x-axis. Two symmetric lines, $y = x \tan \Theta$ and $y = -x \tan \Theta$ are drawn. These lines are the extreme rays emanating from the point source. Another pair of symmetric lines, $y = \pm(1-x) \tan \Phi$, are drawn. These lines define the acceptance angle of the optical fiber. Let $x = \xi$ be the x coordinate of the point at which the lines $y = x \tan \Theta$ and $y = (1-x) \tan \Phi$ meet, i.e.

$$\xi = \frac{\tan \Phi}{\tan \Theta + \tan \Phi}$$

Two ellipses can then be constructed. The first ellipse, $E_2$, referred to as element 20 in FIG. 1, has foci at (0,0) and ($\xi$,0), and passes through the point (1,0), the opening of the optical fiber. The equation of this ellipse is $$\frac{\left(x - \frac{\xi}{2}\right)^2}{\left(1 - \frac{\xi}{2}\right)^2} + \frac{y^2}{\frac{(2-\xi)^2 - (\xi)^2}{4}} = 1$$

The second ellipse, $E_1$, referred to as element 18 in FIG. 1, has foci at ($\xi$,0) and (1,0) and passes through the point (0,0), the location of the point source. The equation for this ellipse is $$\frac{\left(x - \frac{1+\xi}{2}\right)^2}{\left(\frac{1-\xi}{2}\right)^2} + \frac{y^2}{\frac{(1-\xi)^2 - (1-\xi)^2}{4}} = 1$$

The segment of $E_1$ that is cut off by the lines $y = \pm(1-x) \tan \Phi$, and the segment of $E_2$ that is cut off by the lines $y = \pm x \tan \Theta$, are silvered so that they are reflectors.

Now, consider any light ray emanating from the point source. Since that part of $E_2$ that will be stricken by such rays has been silvered, and since the point source is at a focus of $E_2$, such a ray will be reflected from $E_2$, and will pass through the point ($\xi$,0), the other focus of $E_2$. The ray will eventually strike $E_1$. If it strikes $E_1$ where $E_1$ is silvered, the ray will be reflected from $E_1$. The ray will then pass through point (1,0), the location of the beginning of the optical fiber, the other focus of $E_1$. In this case, the ray will enter the optical fiber at an angle below the acceptance angle; that part of $E_1$ that would reflect such rays below the acceptance angle is silvered. Mathematical theory confirms that such a ray will actually strike $E_1$ on a section that is silvered if $\Phi$ is less than $\Theta$.

The net result of the use of these mathematical formulas is the construction of a coupling device utilizing two opposed elliptical mirrors as shown in FIG. 2. The first concave elliptical mirror 22 is positioned opposite the second concave elliptical mirror 24. The mirrors 22 and 24 are positioned within housing 30 by end caps 26 and 28, respectively, to which the mirrors 22 and 24 are attached by any means known to those skilled in the art. For example, the mirrored surfaces can be mechanically connected or glued to the end caps, or the mirrored surfaces can be coated directly onto the end caps. The end caps 26 and 28 are finely threaded to allow for screw-type positioning of the end caps to the ends 40 and 42 of the housing 30. Thus, in addition to providing a means for holding or receiving the mirrors, the end caps also allow for coaxial centering and longitudinal spacing of the opposed mirrors. This in turn allows for critical positioning of the mirrors within the housing so that correct redirection of the laser diode into the acceptance angle of the fiber is obtained.

Additionally, the end caps 26 and 28 provide means for positioning the laser diode 34 and the light receiving end 38 of the optical fiber 44, respectively. As shown, the laser diode 34 is mounted within a separate housing 32 which threads into the end cap 26 so that the laser diode 34 is positioned coaxially within the aperture 46 of the first mirror 22. The optical fiber 44 is also mounted within a separate housing 36 which threads into the end cap 28 so that the light receiving end 38 of the optical fiber 44 is positioned coaxially within the aperture 48 of the second mirror 24. Preferably, the light receiving end 38 of the optical fiber 44 is flush with the surface of the second mirror 24. In other words, the plane of the fiber end face or entrance pupil is parallel to the plane of the second mirror at the aperture therein. This allows for a very small aperture 48 while still allowing all reflected light from first mirror 22 to fall within the angle of acceptance of the fiber. This ability to have a very small aperture allows for increased mirrored surface on the second mirror so as to maximize collection efficiency.

Due to the elliptical configuration of the mirrors, for maximum collection efficiency the position of one mirror is coincident with the focal point of the other mirror. This results in the positioning of the laser diode at one focal point of the second mirror and surrounded by the first mirror, and the positioning of the light receiving end of the optical fiber at one focal point of the first mirror and surrounded by the second mirror.

In use, light emanating from laser diode 34 passes through aperture 46 of the first mirror 22 and is back reflected by the second mirror 24. The light then impinges on the first mirror 22 where it is redirected through the aperture 48 of the second mirror 24. The light then strikes the light receiving end 38 of the optical fiber 44. Thus, the divergent light from the laser diode source is redirected to impinge upon the optical fiber within the maximum acceptance angle of the fiber.

As should be readily apparent, the actual shape and construction of the housing and end caps can be altered.

The requirement is that the configuration of the catoptric coupling device permit the collection of the divergent rays at the small aperture of the optical fiber through the use of the opposed mirrors.

Thus, a further embodiment also utilizing two opposed concave elliptical mirrors is shown in FIG. 3. In this embodiment, the first mirror 50 and second mirror 52 are again positioned within housing 54 utilizing threaded end caps 56 and 58. The laser diode 60 and light receiving end 62 of the optical fiber 64 are positioned at the apertures 66 and 68 with the separate threaded housings 70 and 72, respectively. This further embodiment differs from the embodiment shown in FIG. 1 in the specific construction of the housing and end caps. A lens 17 is also added to the laser diode for reducing the angular light spread from the laser diode.

It is also possible to construct a coupling device in which the mirrors are separated by a transparent solid material, as opposed to the separation by the transparent gas (e.g. air) as shown in FIGS. 2 and 3. This additional embodiment is depicted in FIG. 4. As shown, the first mirror 74 and the second mirror 76 are coated onto the ends of a transparent solid material 78, such as plastic or glass. The coating can be performed by any means known to those skilled in the art, such as by evaporation. The center 80 of the transparent solid material 78 is threaded or snap fitted to the housing 82 to hold the material in place within the housing. All other elements shown are similar to those depicted in FIGS. 2 and 3.

Figure 5:
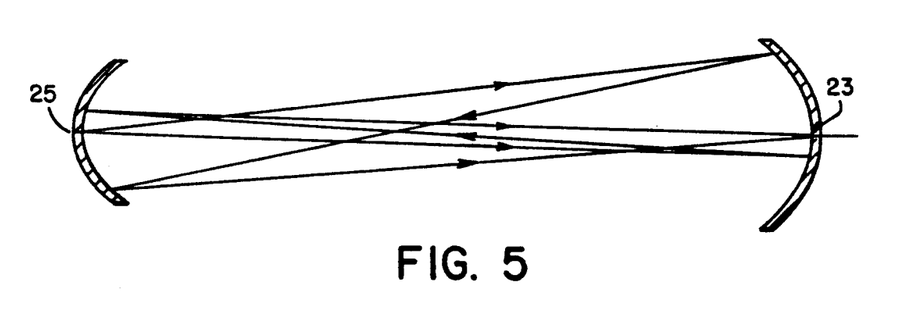
FIG. 5 illustrates the optical ray paths when two opposed elliptical mirrors are utilized to couple a laser diode to an optical fiber.

Each of the embodiments shown in FIGS. 2-4 utilize opposed concave elliptical mirrors. FIG. 5 illustrates the optical ray paths within such embodiments and how the divergent beam from the laser diode source 25 is redirected to the small aperture of the optical fiber 23. Placement of the laser diode and the optical fiber within the apertures of the mirrors requires that the mirrors be precisely located at the foci of each respective mirror. This strict alignment requirement can be alleviated by the use of yet another embodiment.

Figure 6:
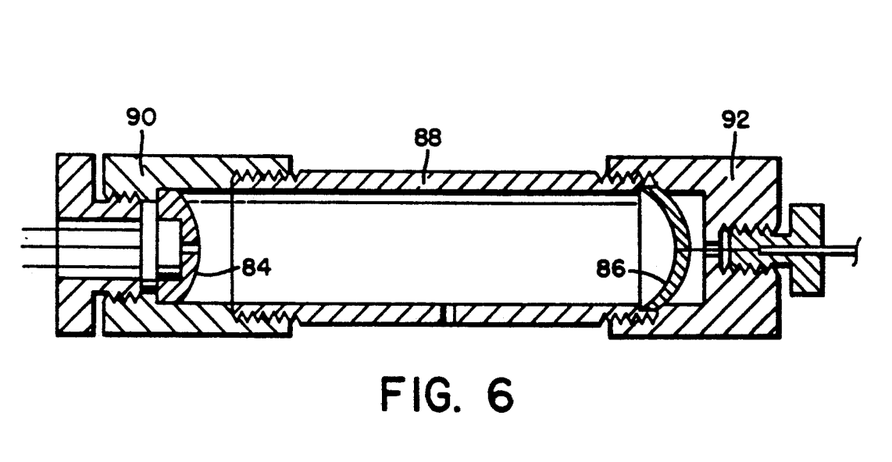
FIG. 6 shows a catoptric coupling device which is one embodiment of the subject invention in which two opposed spherical mirrors, one concave and one convex, are utilized.

In this further embodiment, it is possible to redirect the beam utilizing spherical mirrors. As shown in FIG. 6, the first mirror 84 is a convex spherical mirror and the second mirror 86 is a concave spherical mirror. Other elements are similar to those depicted in FIGS. 2-4, except that once again the specific construction of the housing 88 and end caps 90 and 92 are altered to illustrate a further variation. The distance between the two spherical mirrors is adjusted based on the radius of curvature of the two mirrors in order to maximize collection efficiency. Optimum placement of these mirrors, as well as the curvature of the mirrors, can be determined by one skilled in the art by utilizing available computer software programs (i.e. OSLO Series 2 Optical Design Program, Revision 2.1 [1991], available from Sinclair Optics, 6780 Palmyra Road, Fairport, New York 14450) and by altering the distance and measuring the light received at the optical fiber. Such measurement can be readily accomplished using available optical detectors known to those skilled in the art, such as silicon cells.

Figure 7:
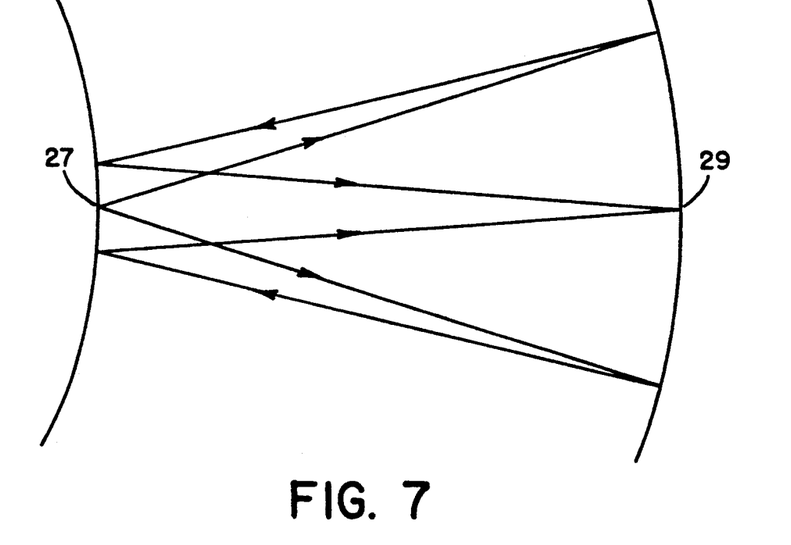
FIG. 7 illustrates the optical ray paths when illustrates the optical ray paths when two opposed spherical mirrors, one concave and one convex, are utilized to couple a laser diode to an optical fiber.
Figure 8:
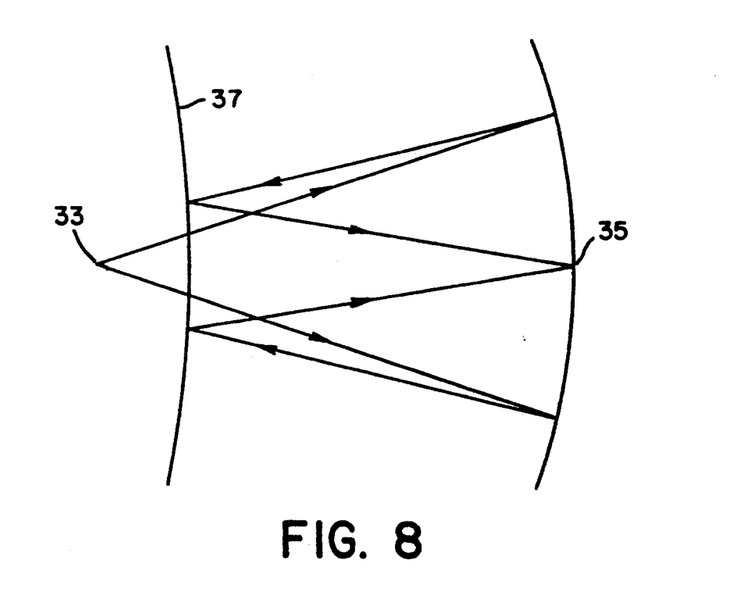
FIG. 8 illustrates the optical ray paths when two opposed spherical mirrors, one concave and one convex, are utilized to couple an offset laser diode to an optical fiber.

FIG. 7 illustrates the optical ray paths of embodiments of the subject invention which utilize opposed spherical mirrors. Once again, the divergent beam from the laser diode source 27 is redirected to the small aperture of the optical fiber 29. This is also true when the laser diode 33 is offset behind the first mirror 37, as shown in FIG. 8. The divergent light beam is still redirected to the small aperture of the optical fiber 35. The system is constructed such that some misalignment is tolerated and still results in focusing of the beam on the core of the optical fiber. Thus, the diameter of light entering the fiber is slightly smaller than the diameter of the core (or acceptance angle) so that minor deviations from the exact center of the core still result in focusing of the beam within the core.

Figure 9:
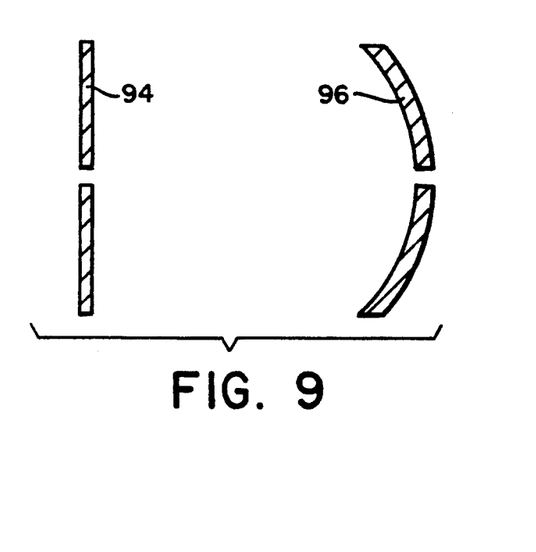
FIG. 9 shows a catoptric coupling device which is one embodiment of the subject invention in which a planar mirror and an opposing concave spherical mirror are utilized to couple a laser diode to an optical fiber.
Figure 10:
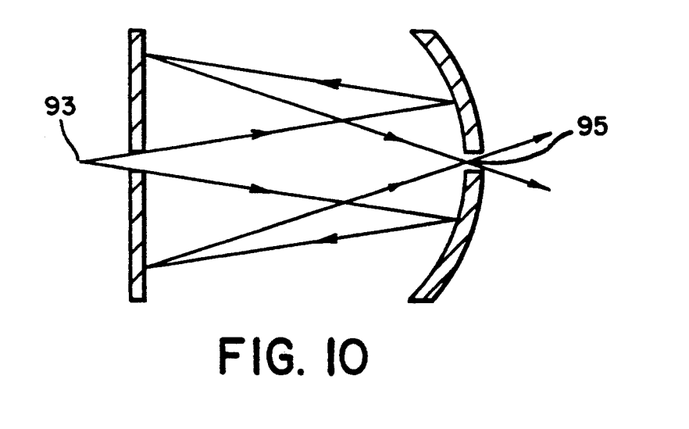
FIG. 10 illustrates the optical ray paths when a planar mirror and an opposing concave spherical mirror are utilized to couple a laser diode to an optical fiber.

In addition to elliptical and spherical mirrors, FIG. 9 illustrates an embodiment of the subject invention in which a planar mirror 94 and a concave spherical mirror 96 are combined. The optical ray paths, shown in FIG. 10, again illustrate redirection of the divergent beam of an offset laser diode 93 to the optical fiber 95.

In practice, the catoptric coupling device is produced as a small, preferably plastic, device which can be transported easily into the field by fiber optic technicians. The plastic housing, including the two opposed mirrors critically positioned therein, will be taken to a site where an on-site laser diode can be connected to one end of the device and an on-site optical fiber can be connected to the other end of the device. Alternatively, a laser diode can be connected to the device prior to arriving at a field site. The ends of the housing are manufactured such that connection of the laser diode and the optical fiber results in coaxial alignment of all elements for accurate and efficient redirection of the laser diode emission. The efficiency can be tested utilizing field sized optical detectors to measure the output from the aperture after connection of the laser diode to the opposite end of the device.

As should be readily apparent, the subject invention provides for the use of two opposed mirrored surfaces for maximum collection efficiency from a laser diode to an optical fiber. By providing apertures within the mirrored surfaces, the emission from a laser diode is redirected to within the acceptance angle of the fiber. Advantages of the subject invention are thus readily apparent. The resulting catoptric coupling device directs a large portion, e.g., greater than 90%, of the divergent light from the laser diode to an optical fiber. This is especially true for single or multi mode gradient-index or step-index fiber. The device also maximizes the light collection efficiency from an inherent, elliptical-shaped laser diode beam emission. Back reflection of light is minimized through the use of non-planar, reflecting surfaces. The use of mirrors also frees the system of chromatic aberration, therefore maintaining constant focus independent of the laser diode wavelength phase shifts. The device also directs light rays so that they will focus within the numerical aperture (maximum acceptance angle) of the fiber core.

The following examples describe several specific embodiments of the subject invention, and are not intended to limit the invention to such specific dimensions or placement. These examples are merely illustrative of suitable catoptric coupling devices according to the invention.

EXAMPLE 1

The first mirror is a convex mirror with a radius of 10.50 mm, a focal length of $-5.25$, a diameter (aperture) of 5.0 mm, and a center hole of about 0.5 mm. The second mirror is a concave mirror with a radius of $-20.50$ mm, a focal length of $-10.25$, an aperture of 5.0 mm, and a center hole of 0.10 mm. The mirror separation is 7.74260. The mirror is silvered with 99.9% reflectivity at $\lambda = 0.6328$ $\mu$. The focal spot size (RMS Radial) is 0.00338 mm. This catoptric coupling device concentrates 96.6% of the light emission for an initial spread (full angle) of 35°, with a focal angle at the fiber pupil of 15.8°.

EXAMPLE 2

The first mirror is a convex mirror having a radius of −8.40 mm and an aperture of 5.0 mm. The second mirror is a concave mirror having a radius of −7.80 mm and an aperture of 5.0 mm. The mirror separation is 7.31641. The focal spot size (RMS Radial) is 0.0007 and the focal angle at the fiber pupil of 9.5°.

EXAMPLE 3

The first mirror is a convex mirror having a radius of −10.50 mm and an aperture of 5.0 mm. The second mirror is a concave mirror having a radius of −8.40 mm and an aperture of 5.0 mm. The mirror separation is 7.43126. The focal spot size (RMS Radial) is 0.0020 and the focal angle at the fiber pupil is 8.25°.

EXAMPLE 4

The two mirrors are opposed elliptical mirrors. The first mirror has a radius of −0.74873 mm and an aperture of 0.40 mm. The conic constant (cc) of the first mirror is −0.33084. The second mirror has a radius of 0.55218 mm and an aperture of 0.40 mm. The conic constant of the second mirror is −0.20092. The mirror separation is 1.00. The focal spot size (RMS Radial) is 0.00696 and the focal angle at the fiber pupil is 7.62°.

EXAMPLE 5

The first mirror is a plano mirror having a radius of ∞, and an aperture of 5.0 mm. The second mirror is a concave mirror having a radius of −9.85093 mm and an aperture of 5.0 mm. The mirror separation is 6.45985 mm. The focal spot size (RMS Radial) is 0.00658 and the focal angle at the fiber pupil is 11.6°.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as defined by the following claims.

What is claimed is:

1. A catoptric coupling device for directing radiant energy from a source to an optical fiber, said device comprising:
    a first mirrored surface having a first aperture therein;
    a second mirrored surface facing said first mirrored surface, said second mirrored surface having a second aperture therein, said second aperture coaxial with said first aperture;
    a housing defining an enclosed space having opposed ends spaced along a longitudinal axis coaxial with said first aperture, wherein said first mirrored surface and said second mirrored surface are positioned within said housing; and
    an end cap threaded to each of said opposed ends of said housing;
    wherein one of said end caps comprises means for positioning a source of radiant energy coaxially with said first aperture and opposite said second mirrored surface and wherein the other of said end caps comprises means for positioning a light receiving end of an optical fiber coaxially with said second aperture, wherein substantially all radiant energy generated by a source of radiant energy so positioned passes through said first aperture and impinges upon said second mirrored surface, said radiant energy thereby being reflected by said second mirrored surface so as to impinge upon said first mirrored surface, wherein said radiant energy impinging upon said first mirrored surface is thereby reflected by said first mirrored surface so as to pass through said second aperture and thereby impinge upon a light receiving end of an optical fiber so positioned.

2. The catoptric coupling device of claim 1 wherein said first mirrored surface comprises a concave elliptical surface and said second mirrored surface comprises a concave elliptical surface.

3. The catoptric coupling device of claim 2 further comprising an optical fiber so positioned essentially at one focus of said concave elliptical first mirrored surface.

4. The catoptric coupling device of claim 2 further comprising a source of radiant energy so positioned essentially at one focus of said concave elliptical second mirrored surface.

5. The catoptric coupling device of claim 1 wherein said first mirrored surface comprises a concave spherical surface and said second mirrored surface comprises a concave spherical surface.

6. The catoptric coupling device of claim 1 wherein said first mirrored surface comprises a planar surface and said second mirrored surface comprises a concave spherical surface.

7. The catoptric coupling device of claim 1 wherein said one of said end caps comprises means for positioning said first mirrored surface.

8. The catoptric coupling device of claim 1 wherein said other of said end caps comprises means for positioning said second mirrored surface.

9. The catoptric coupling device of claim 1 wherein a plane of said fiber end is parallel to a plane of said second mirrored surface at said second aperture.

10. The catoptric coupling device of claim 1 further comprising a source of radiant energy.

11. The catoptric coupling device of claim 10 wherein said source of radiant energy comprises a laser diode.

12. The catoptric coupling device of claim 11 wherein said laser diode emits a beam of radiant energy having a maximum cone angle, and wherein said second mirrored surface accepts radiation falling within said maximum cone angle.

13. The catoptric coupling device of claim 1 further comprising an optical fiber having a light receiving end.

14. The catoptric coupling device of claim 13 wherein said optical fiber has an angle of acceptance of radiant energy, and wherein substantially all of said radiant energy impinges upon said light receiving end within said angle of acceptance.

15. The catoptric coupling device of claim 13 wherein said optical fiber accepts radiation falling within a maximum cone angle, and wherein said first mirrored surface reflects radiant energy within said maximum cone angle.

16. The catoptric coupling device of claim 13 wherein said optical fiber has a diameter of about 4 to about 50 microns.

17. The catoptric coupling device of claim 1 wherein said enclosed space is filled with a transparent refractive body between said first mirrored surface and said second mirrored surface.

18. The catoptric coupling device of claim 1 wherein said enclosed space is filled with a transparent gas between said first mirrored surface and said second mirrored surface.

19. A catoptric coupling device for directing radiant energy from a source to an optical fiber, said device comprising:
a first mirrored surface having a first aperture therein;
a second mirrored surface facing said first mirrored surface, said second mirrored surface having a second aperture therein, said second aperture coaxial with said first aperture;
a housing defining an enclosed space having opposed ends spaced along a longitudinal axis coaxial with said first aperture;
an end cap threaded to each of said opposed ends of said housing, wherein one of said end caps comprises means for positioning said first mirrored surface within said housing and wherein the other of said end caps comprises means for positioning said second mirrored surface within said housing;
means for positioning a source of radiant energy coaxially with said first aperture and opposite said second mirrored surface; and
means for positioning a light receiving end of an optical fiber coaxially with said second aperture,
wherein substantially all radiant energy generated by a source of radiant energy so positioned passes through said first aperture and impinges upon said second mirrored surface, said radiant energy thereby being reflected by said second mirrored surface so as to impinge upon said first mirrored surface, wherein said radiant energy impinging upon said first mirrored surface is thereby reflected by said first mirrored surface so as to pass through said second aperture and thereby impinge upon a light receiving end of an optical fiber so positioned.

20. The catoptric coupling device of claim 19, wherein said means for positioning a source of radiant energy comprises said one of said end caps.

21. The catoptric coupling device of claim 19 wherein said means for positioning a light receiving end of an optical fiber comprises the other of said end caps.

22. A method for directing radiant energy from a source to an optical fiber, said method comprising:
selecting a first mirrored surface having a first aperture therein;
selecting a second mirrored surface having a second aperture therein;
selecting a housing defining an enclosed space having opposed ends;
positioning said first mirrored surface and said second mirrored surface within said housing such that said opposed ends are spaced along a longitudinal axis coaxial with said first aperture and such that said second mirrored surface faces said first mirrored surface;
mounting a source of radiant energy to a first threaded end cap;
threading said first threaded end cap to one of said opposed ends of said housing, thereby positioning said source of radiant energy coaxially with said first aperture and opposite said second mirrored surface;
mounting a light receiving end of an optical fiber to a second threaded end cap;
threading said second threaded end cap to the other of said opposed ends of said housing, thereby positioning said light receiving end of said optical fiber coaxially with said second aperture;
emitting a beam of radiant energy from said source;
passing said beam of radiant energy through said first aperture in said first mirrored surface;
reflecting said beam of radiant energy off said second mirrored surface so as to direct said reflected beam of radiant energy toward said first mirrored surface; and
re-reflecting said reflected beam of radiant energy off said first mirrored surface so as to direct said beam of radiant energy through said second aperture in said second mirrored surface, thereby directing said beam of radiant energy onto said optical fiber positioned at said second aperture in said second mirrored surface.

23. A method for directing radiant energy from a source to an optical fiber, said method comprising:
selecting a first mirrored surface having a first aperture therein;
selecting a second mirrored surface having a second aperture therein;
selecting a housing defining an enclosed space having opposed ends;
mounting a source of radiant energy to a first threaded end cap and said second mirrored surface to a second threaded end cap;
threading said first threaded end cap to one of said opposed ends of said housing and said second threaded end cap to the other of said opposed ends of said housing, such that said opposed ends are spaced along a longitudinal axis coaxial with said first aperture and such that said second mirrored surface faces said first mirrored surface within said housing;
positioning a source of radiant energy coaxially with said first aperture and opposite said second mirrored surface;
positioning a light receiving end of an optical fiber coaxially with said second aperture;
emitting a beam of radiant energy from said source;
passing said beam of radiant energy through said first aperture in said first mirrored surface;
reflecting said beam of radiant energy off said second mirrored surface so as to direct said reflected beam of radiant energy toward said first mirrored surface; and
re-reflecting said reflected beam of radiant energy off said first mirrored surface so as to direct said beam of radiant energy through said second aperture in said second mirrored surface, thereby directing said beam of radiant energy onto said optical fiber positioned at said second aperture in said second mirrored surface.

* * * * *

UNITED STATES PATENT AND TRADEMARK OFFICE
CERTIFICATE OF CORRECTION

PATENT NO. : 5,301,249
DATED : April 5, 1994
INVENTOR(S) : David P. Hamblen and David S. Ross It is certified that error appears in the above-indentified patent and that said Letters Patent is hereby corrected as shown below:

Column 3, line 42, delete "illustrates the optical ray paths when".

Column 4, line 53, change "ooaxially" to --coaxially--.

Column 10, line 25, claim 5, change "concave" to --convex--.

Column 12, line 32, claim 23, change "a source of radiant energy" to --said first mirrored surface--.

Signed and Sealed this

Fourth Day of October, 1994

Attest:

BRUCE LEHMAN

*Attesting Officer*     *Commissioner of Patents and Trademarks*